United States Patent [19]

Janzito

[11] 4,418,922
[45] Dec. 6, 1983

[54] TRIPLE CONTACT SEAL

[75] Inventor: Richard Janzito, St. Clair Shores, Mich.

[73] Assignee: Martin Distributors, Livonia, Mich.

[21] Appl. No.: 457,496

[22] Filed: Jan. 12, 1983

[51] Int. Cl.³ .............................................. F16J 15/32
[52] U.S. Cl. .................................... 277/152; 277/221
[58] Field of Search .................. 277/152, 153, 207 R, 277/221, 216

[56] References Cited

U.S. PATENT DOCUMENTS

| | | | |
|---|---|---|---|
| 3,123,367 | 3/1964 | Brummer et al. | 277/207 R |
| 3,727,923 | 4/1973 | McEwen | 277/153 |
| 4,140,323 | 2/1979 | Jacobs | 277/207 R |
| 4,361,337 | 11/1982 | Montes | 277/22 |

Primary Examiner—Robert I. Smith
Attorney, Agent, or Firm—McWilliams, Mann, Zummer and Sweeney

[57] ABSTRACT

This invention relates to a triple contact shaft seal for use adjacent to a gear box adapted to provide multiple seals about the shaft and a sealing contact with the gear box. The seal includes a circumferential body having an aperture, a radial flange and a seal section having inner and outer lips adapted to contact the shaft and a sealing surface on a face of the flange adapted to contact the gear box, such sealing surface including circumferentially extending ribs in sealing engagement with the box.

8 Claims, 3 Drawing Figures

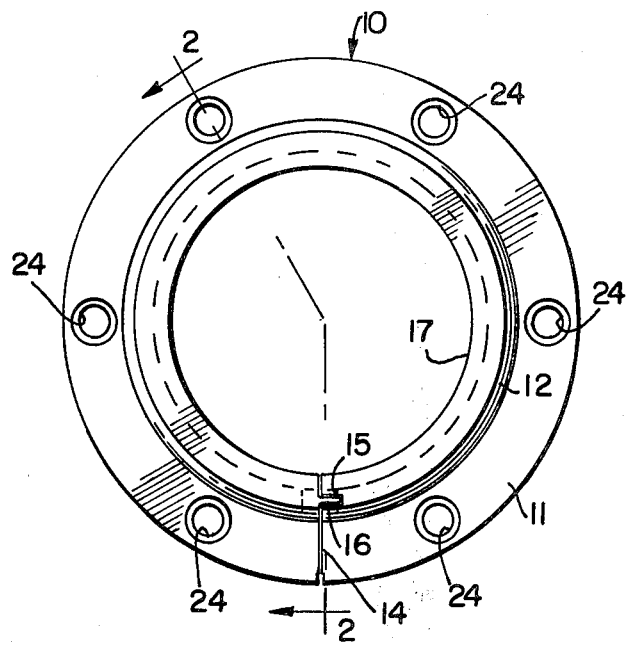
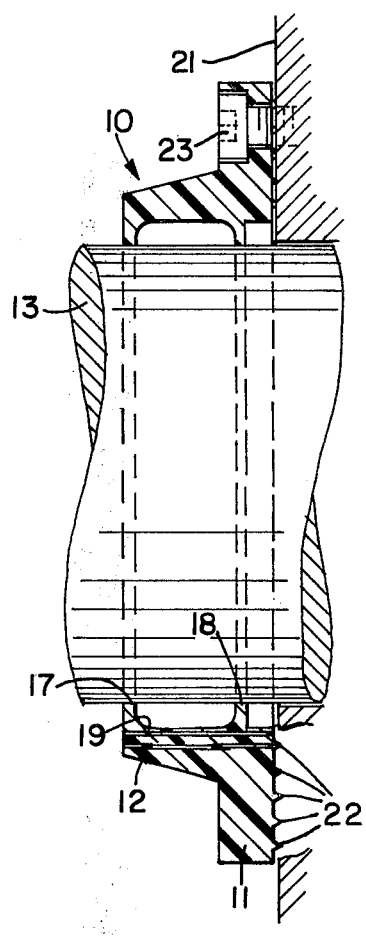
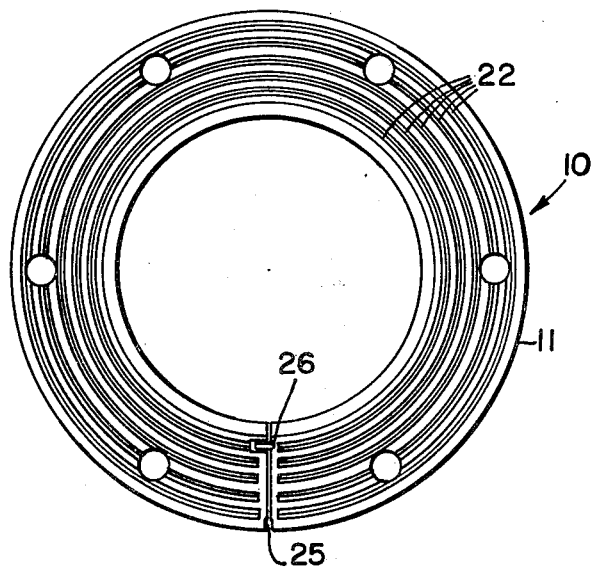

TRIPLE CONTACT SEAL

BACKGROUND OF THE INVENTION

Various prior art patents disclose a number of sealing arrangements, some for use on rotating shafts, other in pipe joints, axle seals as on railway journal bearings, between multiple rotating parts, as automotive rear axle seals and others between a shaft and a fixed housing.

Examples of prior sealing arrangements are revealed in the patent art such as Perrow U.S. Pat. No. 2,561,884 which reveals a pipe joint seal and discloses an outer face having one or more annular grooves pressed against a wall to form a seal.

Zavoda U.S. Pat. No. 2,851,315 relates to a seal having an inwardly extending flange acting as an inner sealing flange and an outer sealing flange with a cavity between such flanges. A spring maintains the sealing flanges in operative relation to a metal sleeve and openings through the sleeve serve as drain holes.

Kosatka U.S. Pat. No. 3,022,081 is directed to a self-contained fluid seal for use between relatively rotating machine parts wherein a tube of elastomer has a lead-in ring containing auxiliary sealing lips which abut the inner surface of a radial wall.

Paterson U.S. Pat. No. 3,363,952 discloses a dual lip seal on a rotary shaft and is for use in association with a railway axle journal. The seal includes a fluid sealing inner lip and an outer dust sealing lip.

McEwen U.S. Pat. No. 3,727,923 describes a shaft seal having a sealing annulus and a pair of spaced seal lips adapted to engage the shaft. The second lip is biased into contact with the shaft when the first sealing lip becomes worn, thus affording a second service life for the seal. The inner sealing sleeve is interconnected with an outer sleeve and an annular web.

Fryatt U.S. Pat. No. 4,208,059 discloses a rotary shaft lip seal with two annular sealing lips and a baffle providing a partition across the annular space between the lips. The sealing lips are disposed at an angle to the shaft, which tends to draw any leaked fluid back to the body of fluid being sealed.

These patents fail to show a combination seal arrangement including a multiple lip seal contacting a shaft with a hollow chamber between the lips and a radial face on the seal having a rear surface which includes a plurality of circumferential sealing ribs engaging a gear box.

SUMMARY OF THE INVENTION

The invention relates to a shaft roll seal of the type that normally is disposed at the bearing and gear box end of a shaft used on a steel mill descale table. The seal is in the form of a triple contact seal which affords three separate sealing surfaces, two of them adapted to contact the shaft and the third adapted to contact the gear box. A seal section has an outer lip and an inner lip positioned to contact the rotatable shaft and each lip provides a sealing surface with the shaft.

A hollow chamber is disposed between the inner and outer lips and a radially extending flange is included on the seal which has an inner face defining a rear surface that has a plurality of circumferentially disposed ribs projecting therefrom designed to contact a bearing housing wall on the gear box and thereby provide the third sealing surface.

DESCRIPTION OF THE DRAWINGS

The foregoing improved seal structure is obtained by the arrangement illustrated in the accompanying drawings, wherein FIG. 1 is a front elevational view of the seal with the rotating shaft therein and shown in section;

FIG. 2 is a vertical cross section through the seal taken on the line 2—2 of FIG. 1 showing the fastening means securing the seal in fixed relation to a gear box wall; and FIG. 3 is a rear elevational view of the seal arrangement showing the circumferential ribs extending in straggered relation around a face of the outstanding radial flange.

DESCRIPTION OF PREFERRED EMBODIMENT

The shaft seal structure of this invention is used adjacent to gear box end of the shaft utilized on a descale table of a steel mill near a supporting bearing. The seal includes a radial flange and a seal body section perpendicular thereto which includes lip seals at opposite sides of a hollow chamber with each of the spaced lips adapted to contact the shaft surface whereby spaced sealing surfaces are provided in engagement with the shaft.

The radial face of the flange engages the gear box and a plurality of circumferentially disposed ribs are designed to contact a bearing housing wall on the gear box to provide an additional sealing engagement. Thus, a triple contact seal engagement is provided between the shaft and gear box including the two lip seals contacting the rotating shaft and the radial flange rib seal engaging the gear box in abutting relation.

As shown in the drawings, the seal 10 comprises a flanged body section, more or less in the form of a ring, including a radially disposed flange 11 and a generally perpendicularly related seal section 12. The seal 10 encircles a shaft 13 and in order to mount the seal on the shaft the seal is split on a line 14 whereby the seal ring can be opened up and slipped over the shaft and then rejoined.

The split 14 affords an interengaging interlock between the two portions of the seal which extends entirely across the full depth of the seal section 12 and the thickness of the flange 11. The interlock includes a groove 15 recessed in the one portion of the ring and a projecting tongue 16 extending from the other ring portion and fitting into the groove 15 whereby to provide the interfitting relationship between the two ring portions and effectively close the joint 14 substantially to complete the continuity of the seal ring and thereby prevent any leakage at this point.

The seal section 12 has an outer lip 17 extending radially inwardly toward the shaft 13 and a parallel inner lip 18 extending radially inwardly in spaced relation thereto defining a hollow chamber, or reservoir 19 therebetween. The lips 17 and 18 are positioned to contact the rotating shaft 13 and each lip provides a sealing surface with the shaft.

In addition to the double seal afforded around the shaft 13 by the spaced lips 17 and 18, the radial flange 11 on its face disposed toward the gear box 21 is provided with a plurality of circumferential beads, or ribs 22, concentrically arranged about this face of the flange and projecting outwardly to abut the gear box and provide a third sealing contact which is operative by means of these ribs between the radial flange 11 and the gear box, thus effectively triple sealing the shaft and gear box where the shaft enters the box, against the entry of slag, or dirty water into the bearings and the gear box housing. The seal 10 thus protects these parts from foreign elements to a maximum extent.

The sealing contact of the ribs 22 on the abutting face of the radial flange 11 is brought to bear on the opposing face of the gear box 21 by drawing the ribs 22 tightly into engagement with the box face by means of bolts 23 passing through counterbored holes 24 around the marginal area of the flange 11 whereby an evenly distributed pressure may be applied to effect a tight seal in this area.

It should be noted that the ribs 22 are not continuous around the radial flange surface but are spaced apart adjacent the bottom point of the seal and at least certain of the ribs extend intermittently around the radial flange as best indicated in FIG. 3, which lends a staggered effect to the ribs and breaks up the flow path. By spacing the ribs apart at the bottom, the space between the abutting faces of the flange 11 and gear box 21, is thereby enabled to drain downwardly through this space. The slot 25 at the bottom of the seal ring 11 is a locating slot whereby the space 26 can be disposed downwardly for proper draining.

The seal member 10 is of molded construction and may be made from a non-metallic material such as a plastic selected from the groups of plastic materials including urethane, or silicone. The selection of the particular material, whether it be the urethane type, or the silicone type, will depend on the environment where it will be used and will be related primarily to the temperature at which it will be operated.

CONCLUSION

From the foregoing it can be seen that a steel mill descale table roll seal has been provided which affords maximum protection for the bearings and gear box, or housing, which keeps out contaminants normally encountered in these environments such as slag and dirty warter, or the like. The seal structure importantly comprises a triple contact seal having spaced outer and inner lip seals with a hollow chamber therebetween with such lip seals each having a sealing surface adapted to contact the roll shaft. The third sealing contact is provided by a series of circumferential ribs on a radial flange forming an integral part of the seal, which contact the adjoining face of the gear box in abutting relation and are compressed against the gear box by fastenings securing the seal structure to the gear box.

What is claimed is:

1. A triple contact seal for use on a shaft adjacent to a gear box, said seal including a circumferential body defining an aperture therethrough, a radial flange member, and a seal section connected to said radial flange member, said seal section extending in a direction away from said gear box, said seal section including an outer lip extending radially inwardly adapted to contact said shaft and an inner lip extending radially inwardly adapted to contact said shaft, said inner and outer lips being spaced apart from each other and defining a hollow chamber therebetween, said radial flange member including a sealing surface defined on the face of said flange member adjacent said gear box, said sealing surface including a plurality of circumferentially extending ribs adapted to contact the outer face of said gear box.

2. A seal as set forth in claim 1 wherein said ribs are discontinuous and arranged in staggered relation around said surface.

3. A seal as set forth in claim 2 wherein said ribs have their ends spaced apart adjacent to the bottom area of the flange member whereby to provide a drain path from the space sealed by the ribs.

4. A seal as set forth in claim 1 wherein the seal is split on a radial line at one side of the shaft, said split having a tongue and groove engagement between opposing portions whereby to provide an interlocking joint more effectively sealing said split.

5. A seal as set forth in claim 4 wherein said flange comprises a mounting flange with means for mounting the flange on said gear box extending therethrough.

6. A seal as set forth in claim 5 wherein one of said inner and outer lips is disposed between the inner and outer faces of said flange, and the other lip is disposed in spaced relation from said one lip to define said hollow chamber, and a circumferential wall generally at an acute angle to a face of the mounting flange connecting said lips to complete said chamber.

7. A seal as set forth in claim 6 wherein said tongue and groove interlocking joint is located in said curcumferential body and extends into the area of said mounting flange.

8. A seal as set forth in claim 7 wherein the seal is made from a plastic material selected from the groups of such materials including urethane, or silicone.

* * * * *